June 16, 1936.  F. T. POWERS  2,044,184
APPARATUS FOR MAKING NEGATIVES
Filed May 17, 1934   3 Sheets-Sheet 1
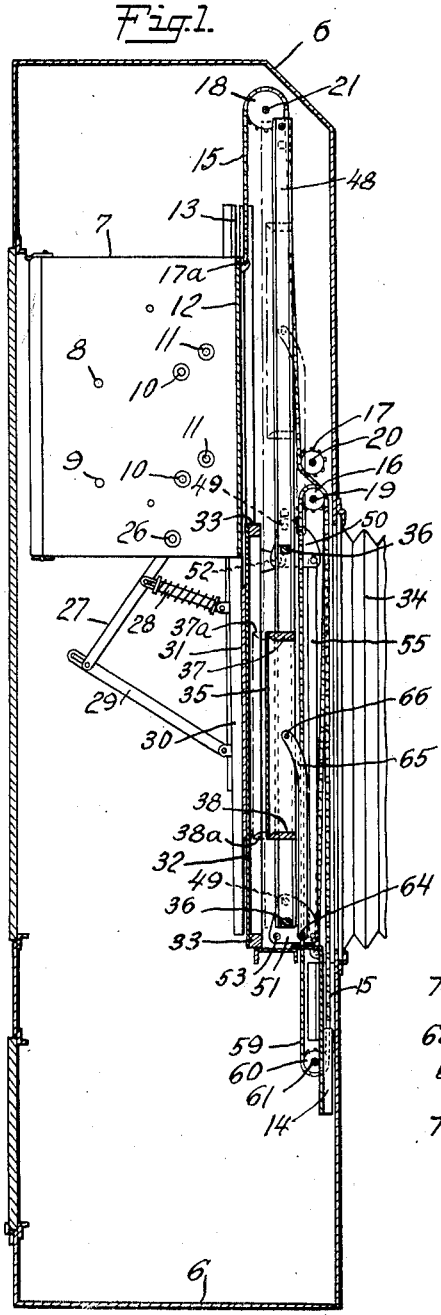
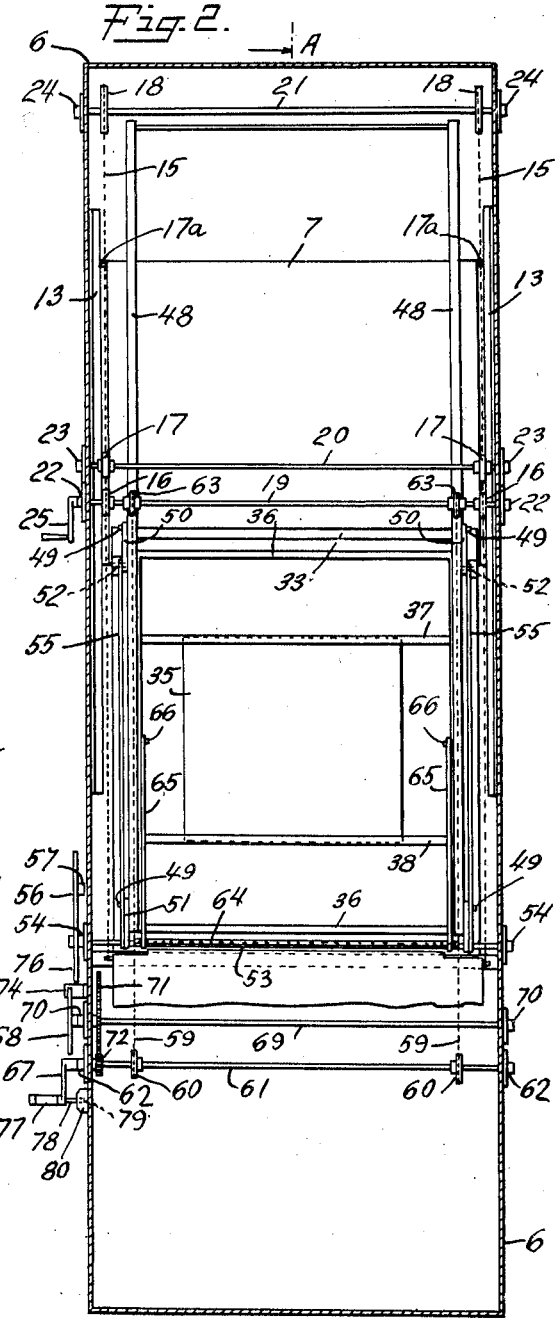
INVENTOR June 16, 1936.   F. T. POWERS   2,044,184
APPARATUS FOR MAKING NEGATIVES
Filed May 17, 1934   3 Sheets-Sheet 2
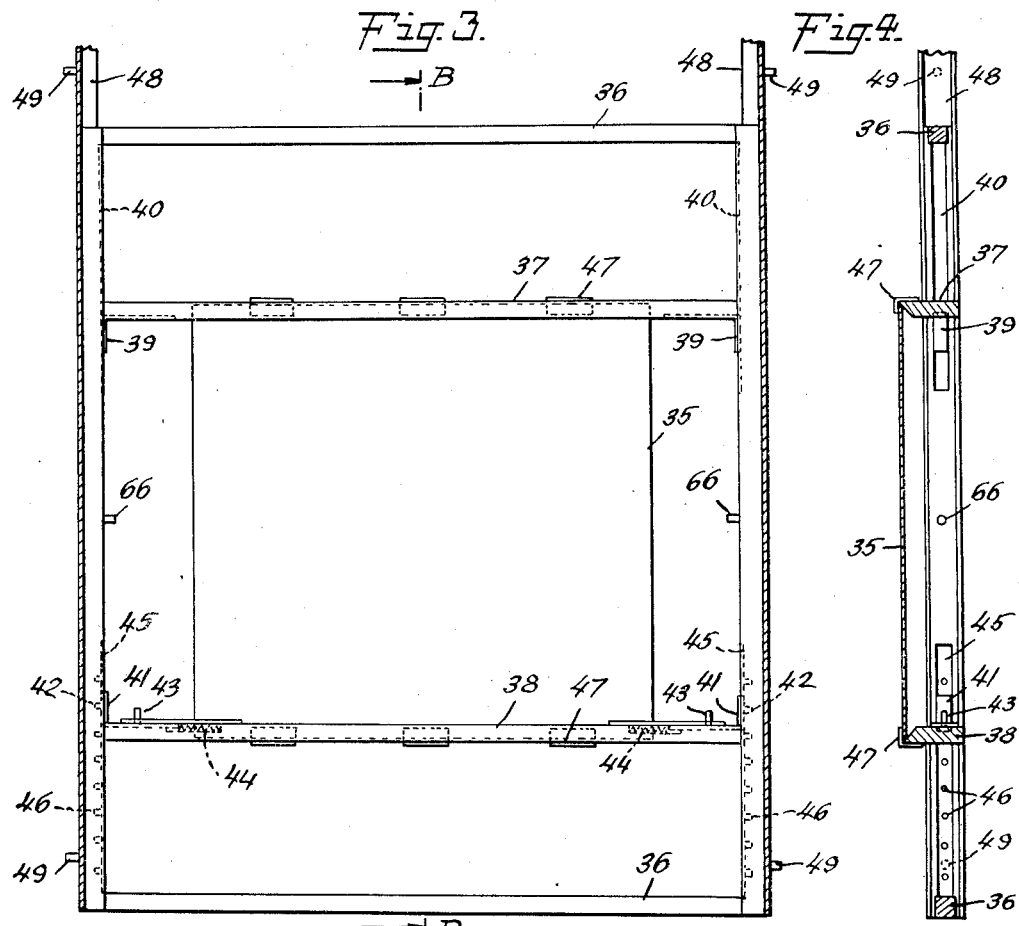
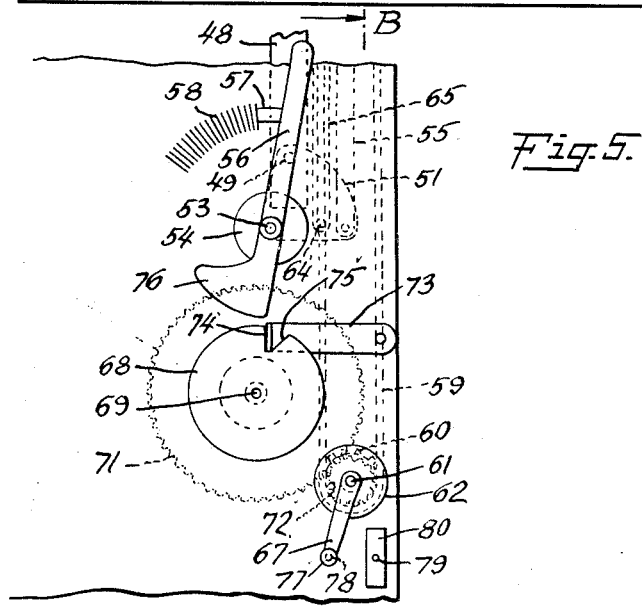
INVENTOR

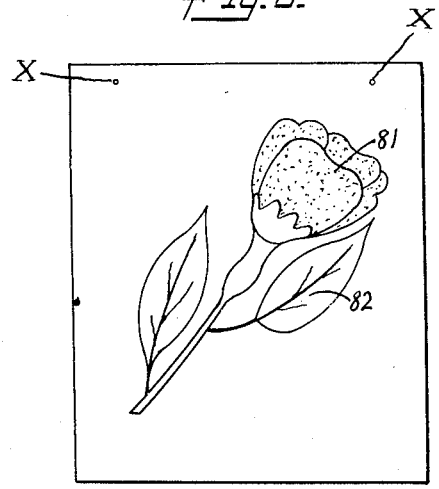
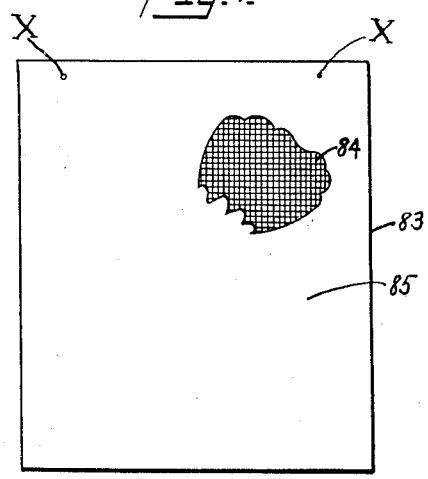
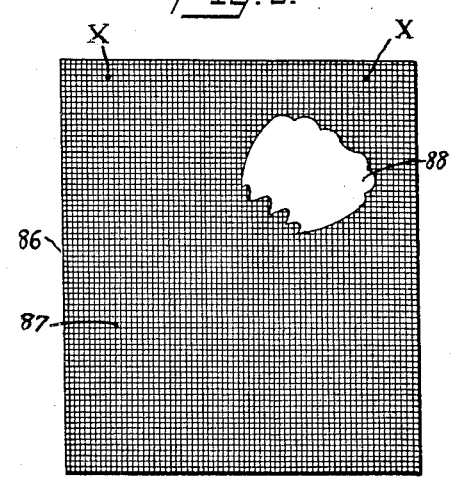

Patented June 16, 1936

2,044,184

UNITED STATES PATENT OFFICE 2,044,184

APPARATUS FOR MAKING NEGATIVES

Frank T. Powers, Douglaston, N. Y.

Application May 17, 1934, Serial No. 726,086

10 Claims. (Cl. 95—81)

My invention relates to the graphic arts and more particularly to the making of negatives for use in producing photomechanical printing plates.

One object of my invention is to provide a means and a method for making combination negatives, by which term I mean negatives which are in part half tone negatives and in part line negatives. Another object is to provide a means and a method for making half tone "drop out" negatives, wherein the dots in the high light areas are dropped out in the operation of making the negative.

Another object is to provide a means operable from the exterior of a camera, for accurately positioning a half tone screen plate in proper relation to the focal plane of the camera and to remove the plate entirely out of the image field of the camera at the will of the operator and without disturbing the adjustment of the camera or admitting light to the interior of the camera chamber.

Other objects and advantages of the invention will be set forth in part hereinafter and in part will be obvious herefrom, or may be learned by practice with the invention, the same being realized and attained by means of the instrumentalities and combinations pointed out in the appended claims.

Heretofore process cameras have been equipped with adjustable devices for holding a half tone screen plate within the image field in proper relation to the focal plane of the image and for varying the distance between the screen plate and the focal plane. The proper distance between the screen plate and the focal plane is a function of the number of lines per inch on the screen and the ratio of reduction or enlargement of the picture being made, a function which is well known to expert photographers experienced in the making of half tone negatives. To place a half tone screen in position in cameras of this type, it has been necessary to open the camera chamber and insert the screen plate in a suitable holder provided therefor. If thereafter it is desired to make a line negative for the making of which no screen plate is used, it has been necessary to open the camera chamber and remove the screen plate. This operation is time consuming, involves the hazard of accident to the very expensive screen plate, and necessitates the protection of the light sensitive medium while the change is being made. It is, therefore, common to employ two cameras, one for line work and one for half tone work, or else to divide up or classify the work so that all line cuts are done at one time, and then insert a screen and do the half tone work, or vice versa. This is a handicap where the work is mixed, as it involves holding up one class of work until the other class is completed.

When combination negatives, or negatives in which a portion of the picture or design being reproduced is to be in half tone and another portion is to be line work, it has been the custom to make two negatives, one in half tone and one in line, and by mechanical means to combine the two negatives to produce the desired combination. This is a slow, delicate and cumbersome process, and to obviate it such substitute devices as the Ben Day process and others have been used.

With the aid of my present invention, line negatives and half tone negatives may be made alternately with practically no loss of time and with no manual handling of the screen plate, and consequently at no risk of damage to so expensive and delicate a piece of equipment.

Successive exposures made with or without a screen may, if desired, be upon the same or different sheets of light sensitive medium, thus enabling the operator to produce on the same negative both half tone and line work from the same copy, or from different copies.

My invention finds particularly advantageous application in connection with process cameras in which the light sensitive medium is utilized in the form of rolls, such as are exemplified in my Patents Nos. 1,832,656 and 1,909,424 issued November 17, 1931, and May 16th, 1933 respectively; but I do not confine the application of my improvement to such cameras, since it may be applied to other forms of process camera used for the making of negatives for line cuts and half tones, or cameras in which it is desirable to use a half tone screen for a part of the time and to operate without a screen for a part of the time.

Of the drawings:—

Fig. 1 is a section of a camera embodying the device taken on the line AA of Fig. 2.

Fig. 2 is the front view of the interior.

Fig. 3 is a front view and

Fig. 4 is a section on the line BB of the device.

Fig. 5 is a detail of the operating and interlocking mechanism.

Fig. 6 is a design to be copied.

Figs. 7 and 8 are friskets used in copying the design.

In these drawings, which are intended to be illustrative and explanatory of a preferred embodiment of the present invention and not restrictive thereof, I have shown my invention as applied to a process camera of the type illustrated and described in my Patent No. 1,909,424, issued May 16, 1933, and to which reference may be made for description of parts of the camera not shown and described herein.

The present invention is aimed toward a mechanism for inserting a half tone screen into, and removing it out of, the field of the image, for adjusting its distance from the focal plane of the image while maintaining the screen in accurate parallelism with the focal plane; and for accomplishing these movements from without the camera and without the necessity of opening the camera or of protecting the light sensitive medium within the camera from light, while the movements and positioning are taking place. It is further aimed at preventing improper or careless manipulation of the mechanism and to insure accuracy in the positioning of the screen. Preferably I provide means for receiving and supporting a half tone screen in a plane parallel to the focal plane and means for moving said supporting means toward or away from the focal plane, while maintaining said parallelism, and also means for moving said supporting means from a position within the area of the field of the image to a position outside of said area and/or vice versa. Means are also provided for indicating on the exterior of the camera the position of the screen, both as to its distance from the focal plane and with respect to the image area. Means are further provided which prevent a careless operator manipulating the said moving means in a manner or in a sequence which might result in injury to the mechanism or to the costly half tone screen.

In the illustrative embodiment here shown, the numeral 6 designates the back of a copying camera within which is supported a box 7 which holds the supply of light sensitive medium in the form of rolls supported on shafts 8 and 9. The strips of light sensitive material are fed into image receiving positon by means of the feed rolls 10 and pressure rolls 11. The box 7 is provided with a front plate 12, the side edges of which run in track ways 13, permitting limited vertical movement within the camera back. The box 7 and its normal contents are counter-balanced by the weight 14 attached to one end of chains 15, which engage sprockets 16, 17 and 18, and attached at their other ends to lugs 17a on the front of box 7. These sprockets are mounted respectively on shafts 19, 20 and 21, which are provided with bearings 22, 23 and 24, respectively, attached to the walls of the back. On one end of shaft 19 is mounted a handle 25, which serves to rotate sprockets 16 to raise or lower box 7 to the desired position.

Rotatably mounted on lower portion of the box 7, by means of the shaft 26, arms 27 and links 28 and 29, is a presser plate 30, by means of which the membrane of light sensitive material 31 is pressed against a glass plate 32 held stationary and in a plane truly perpendicular to the optical axis of the lens of the camera by the frame 33. The camera is provided with the usual bellows 34 and with lens and accessories not shown in the drawings.

With a camera of the foregoing description, or with other forms of cameras, or other photographic or reproduction apparatus, my invention may be employed in various embodiments, one of which is herein described.

Means for supporting a variety of sizes of half tone screen plates, 35, consisting of a holder comprising an outer rectangular frame 36 and horizontal adjustable cross bars 37 and 38. The upper cross bar 37 is provided with angle members 39 at each end, which are adapted to slidingly fit into grooves 40 in the frame 36, permitting limited vertical movement. The lower cross bar 38 is provided at each end with angle members 41, having pins 42 and adapted to be moved laterally with respect to the cross bar 38 by means of knobs 43 attached thereto and to be pressed toward the ends of the bar 38 by springs 44 located in recesses in the bar.

In the lower portion of the side members of the frame 36 are recesses 45 adapted to receive the ends of the cross bar 38. Within these recesses are holes 46 suitably spaced and adapted to receive the pins 42. By an inward pressure on the knobs 43, thus compressing the springs 44, the angle members 41 and the pins 42 may be disengaged from the recess 45 and holes 46, permitting the bar 38 to be moved upward or downward to properly position it to receive a half tone screen of the particular size it is desired to use. The upper cross bar 37 is also slidable but is held in place on the top edge of the screen by gravity and requires no further anchoring. The angle plates 47 attached to cross bars 37 and 38 clip the top and bottom edges of the screen and retain it in position.

Means are provided for positioning the screen holding frame 36 with respect to the focal plane of the camera, comprising a pair of vertical channel guides 48 pivotally supported parallel to the focal plane of the camera by pins 49 which engage two pairs of similar quadrants, 50 and 51 respectively, of which the upper pair, 50 are pivoted on pins 52 rigidly attached to the camera back, and the lower pair 51 are mounted on shaft 53 supported by bearings 54. The quadrants 50 are pivotally connected to quadrants 51 by links 55. One end of shaft 53 is provided with a lever 56 by means of which the quadrants may be rotated through a limited arc to move the guides 48 carrying the screen frame 36 with respect to the focal plane of the camera. The frame 36 engages and is adapted to slide vertically in the guides 48. The location of the quadrants 51 and 52 is near the four corners of the image field of the camera and since they are of similar dimensions and connected in pairs by link bars 55, any rotation of the shaft 53 moves the guides 48 and the frame 36 equal amounts at each corner, thus maintaining parallelism between any two positions of the frame 36 and the guides 48, and also between the frame 36 and the focal plane of the camera.

Means are provided for accurately positioning the screen frame to a known distance from the focal plane of the camera, comprising the lever 56, an indicator leaf 57 attached thereto, and a graduated scale 58 attached to the side of camera back 6. This scale is accurately calibrated to indicate the exact distance between the rear surface of the screen 35 and the surface of the light sensitive material 31, when it is pressed against the rear surface of the glass plate, 32, by the presser plate, 30. Means are provided for moving the half tone screen out of the image field of the camera, comprising a pair of link chains 59, engaging sprockets 60, rigidly attached to shaft 61, supported in bearings 62, and also engaging sprockets 63, loosely mounted on shaft 19. Attached to corresponding links of chains 59 is a cross bar 64, on which are pivotally mounted the lower ends of curved bars, 65, the upper ends of which engage pins 66 attached to frame 36. The crank handle, 67, provides for rotating shaft, 61, and thereby raising or lowering the screen frame, 36, in the channel guides 48 to position it either within or without the image field.

When the half tone screen 35 is within the image field and in operating position with respect to the focal plane, the screen and the screen supporting bars 37 and 38 are in a position such as is indicated by the dotted lines 37a and 38a in Fig. 1 and when in that position frame 36 can not be moved upward to a position outside the image field without striking frame 33. An attempt on the part of a careless operator to raise the screen holder without first moving it forward by means of handle 56 might result in breakage or injury of a very delicate and expensive half tone screen. Means are, therefore, provided to make it impossible to raise the screen except when it is in the forward position indicated by the full lines in Fig. 1. Said means comprise a notched disc 68 rigidly mounted on shaft 69 supported in bearings 70 and carrying a gear 71 meshing with pinion 72 on shaft 61. Pivotally attached to the side of the camera back is a latch bar 73, having an outwardly projecting lip 74 adapted to drop into the notch 75 in disc 68. The lever 56, which controls the lateral position of the screen frame is provided with an extension 76 below the shaft 53 adapted to prevent the lifting of the latch 73, except when the lever 56 is in its extreme position to the scale 58.

In order to raise the screen frame 36 out of the image field of the camera, the latch 73 must first be lifted out of notch 75. This operation can only be accomplished when the lever 56 is in the position in which the extension 76 does not interfere with the lifting of the latch 73. This position of the lever 56 is that corresponding to the forward position of the screen frame in which position it clears the frame 33.

The ratio of the pinion 72 to the gear 71 is such that when the sprockets 60 are rotated a sufficient number of times to elevate the screen frame to the top of its travel, the disc 68 does not make a complete revolution and therefore the notch 75 does not reach a position in which the latch 73 can drop into it and so permit the movement of lever 56. Thus the screen frame 36 can only be moved from its forward position toward the focal plane when it is in its lowest position, and the screen frame can only be raised when it is in its forward position. The handle 77 of the crank 67 is provided with a sliding pin 78, which engages a hole 79 in a boss 80 attached to the side of the camera back. The sprockets 60 are of such diameter that a plurality of complete revolutions is required to carry the screen frame from one extreme position to the other so that the pin 78 will be in position to engage the hole 79 at both the upper and lower positions of the screen frame, thus securing it against accidental movement in either position.

In the practice of my invention I proceed as follows, when making a combination negative of a design such as is shown by way of example in Fig. 6, having a portion, 81, of the design thereon to be reproduced in "half tone" and a portion, 82, in "line work". I first prepare a "frisket" 83 of a transparent material, such as sheet celluloid or other suitable material. I place this sheet over the copy, and with a black or non-light-reflecting medium, such as ink, I cover all portions 84 of the sheet which are over those portions 81 of the copy that are to be reproduced by the half tone method, leaving uncovered those portions 85 which are over the line work 82, as illustrated in Fig. 7. I then remove the sheet from the copy and replace it with another sheet 86 of similar transparent material. I then proceed to cover with the non-light-reflecting medium those portions 87 of the sheet which are over those remaining portions 82 of the copy which are to be reproduced as full lines, leaving uncovered those portions, 88, which are over the areas to be reproduced in half tone, as shown in Fig. 8. I also provide suitable marks, pinholes or attachments for registering these sheets of transparent material on the copy in the exact position that they occupied while the coating was being applied to them, as shown at X in Figs. 6, 7 and 8. I next place the copy—Fig. 6—in the copy holder of a suitable camera and place over it the sheet of transparent material, Fig. 7, in the exact position which it occupied while being prepared, on which all areas to be reproduced by the half tone method are coated. I then make an exposure on any suitable light sensitive medium, such as strip film, or dry plate or wet plate, using suitable stop and time of exposure to produce a satisfactory line negative, all of which is well understood by those skilled in the art. I next replace the transparent sheet with the second sheet, Fig. 8, described above, being careful not to move the copy, and to register the sheet thereon in the exact position which it occupied while being prepared. I then place a half tone line screen in the image field of the camera between the light sensitive medium and the lens and at the most suitable distance from the light sensitive medium. This distance from the light sensitive medium varies with the number of lines per inch on the half tone screen and with the size of stop or diaphragm used in the lens, all of which is well understood by those skilled in the art. I then make a second exposure on the same light sensitive medium, thus producing two images combined thereon, one of those areas of the copy which is to be reproduced as line work, and a second of those areas which are to be reproduced in half tone work. The light sensitive medium may then be removed from the camera and developed by usual methods. I have found that if there are high-light areas in that portion of the copy which is to be reproduced in half tone which it is desired to "drop out", I make a third short exposure on the same light sensitive medium after having removed the screen from the image field of the camera. This short exposure without the screen so obliterates the tiny dots in the high light areas that they completely "drop out" and do not appear on the finished printing plate. This "drop out" exposure made without the half tone screen may be made on the copy being reproduced, or it may be made on a white or light surface, such as a sheet of paper or a surface having a suitable degree of light reflecting quality. This method of dropping out the high lights by making a short exposure without the screen after first having made a suitable exposure with the screen in place, may also be applied to the making of straight half tones even when no line work is involved. In such cases no frisket is needed and the method followed is to first make a normal exposure on the copy with a half tone screen in the camera chamber at a suitable distance from the surface of the light sensitive medium. The screen is then removed from the image field of the camera and a short exposure made without the screen. Upon development of the image on the light sensitive medium the small dots, which would normally be present in the high lights under the usual method, are obliterated or reduced to a degree that they drop out in the finished plate.

Having described my invention in a manner that will enable one skilled in the art to practice it, I will now state what I believe to be new and novel, and for which I pray that Letters Patent be granted.

I claim:

1. A process camera including in combination a light-tight casing, means for presenting light-sensitive material in the focal plane of the camera, means external to the casing for presenting a screen in the image field and withdrawing it therefrom including a trackway, a screen carrier movable on the trackway, and means for moving the trackway and carrier toward and from the light-sensitive material to effect the proper separation for screens of different mesh.

2. A process camera including in combination a light-tight casing, means for supplying light-sensitive material located within the casing at one side of the image field, means for presenting light-sensitive material in the focal plane, a trackway within the casing extending from one side across the image field, a screen carrier movable along the trackway into and out of the image field, means operable from without the casing for moving said screen carrier, into and out of the image field, and means operable from without the casing for moving the trackway and screen carrier along the optical axis of the camera to successively parallel positions, which are perpendicular to said optical axis.

3. A process camera including in combination a lens-carrying chamber, a light-tight casing at the rear of said lens-carrying chamber and extending laterally therefrom, a trackway within said casing extending across the image field and into said laterally extending portion of the casing, a screen carrier mounted on the trackway and provided with means for holding half-tone screens of different sizes, and means operable from without the casing for moving the screen carrier along the trackway into the image field and into the lateral portion out of the image field and means for moving the trackway and the screen carrier mounted thereon, along the optical axis of the camera, to positions perpendicular thereto.

4. A process camera including in combination means for presenting light-sensitive material in the focal plane of the camera, means for presenting a screen in the image field and withdrawing it therefrom including a sectional trackway, a screen carrier movable on the trackway, and means for moving a section of the trackway and carrier toward and from the light-sensitive material to effect proper screen separation.

5. A process camera including in combination a light-tight casing, means for presenting light-sensitive material in the focal plane of the camera, means for moving a half-tone screen into and out of the image field, including a trackway, a screen carrier running on the trackway, endless sprocket chains connected to the carrier and sprocket wheels guiding and supporting the chains and means external to the casing for rotating one or more of the sprocket chains, and means for moving the trackway and the screen carried thereby, toward and away from the lens of the camera.

6. A process camera including in combination, a light-tight camera casing, a half-tone screen within said casing, means for moving the screen into and out of the image field, including a screen carrier and a trackway parallel to the focal plane, and means operable from without the casing for simultaneously moving the trackway and screen carrier along the optical axis of the camera, for varying the distance between the screen and a light-sensitive element.

7. A process camera including in combination a light-tight casing, means for presenting light-sensitive material in the focal plane of the camera, means for guiding and moving a half-tone screen transversely into and out of the light path within the camera, the successive positions of the screen being parallel and substantially perpendicular to the optical axis of the camera, and means, cooperating with said screen-moving, screen-guiding means, for moving the half-tone screen along the optical axis of the camera, when the said screen is in the light path within the camera, for focusing purposes.

8. A process camera including in combination a light-tight casing, means for presenting light-sensitive material in the focal plane of the camera, means for guiding and moving a half-tone screen transversely into and out of the light path within the camera, the successive positions of the screen being parallel and substantially perpendicular to the optical axis of the camera, means, cooperating with said screen-moving and screen-guiding means, for moving the half-tone screen along the optical axis of the camera, when the said screen is in the light path within the camera, for focusing purposes, and means, cooperating with said screen-moving and screen-focusing means, for preventing the movement of the screen out of the light path, unless the screen has been placed in a definite, predetermined position.

9. A process camera including in combination a lens-carrying chamber, a guideway extending laterally from the lens chamber, in a direction substantially perpendicular to the optical axis of the camera, a light-tight casing for said guideway, a carrier for a half-tone screen, movable in said guideway, for carrying the screen into and out of the light path, means for operating said carrier from without the camera, and means cooperating with the guideway and the screen carrier, for moving the screen along the optical axis of the camera, for proper placement of the half-tone screen with respect to the lens.

10. A process camera including in combination a lens chamber, a guideway and housing therefor, extending laterally from the lens chamber, the guideway being substantially perpendicular to the axis of the camera, a carrier for a half-tone screen movable in said guideway for guiding the screen into and out of the lens chamber, and means for moving the guideway and thereby the screen carrier, along the optical axis of the camera.

FRANK T. POWERS.